US008020050B2

(12) United States Patent
DeCusatis et al.

(10) Patent No.: US 8,020,050 B2
(45) Date of Patent: Sep. 13, 2011

(54) VALIDATION OF COMPUTER INTERCONNECTS

(75) Inventors: Casimer M. DeCusatis, Poughkeepsie, NY (US); Aruna V. Ramanan, Poughkeepsie, NY (US); Edward J. Seminaro, Milton, NY (US); Alison B. White, Kingston, NY (US); Daniel G. Young, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 12/428,857

(22) Filed: Apr. 23, 2009

(65) Prior Publication Data

US 2010/0275071 A1  Oct. 28, 2010

(51) Int. Cl.
*G06F 11/00* (2006.01)
(52) U.S. Cl. ........................................................ 714/56
(58) Field of Classification Search .............. 714/10–12, 714/18–22, 25–28, 37–39, 43, 44, 56
See application file for complete search history.

(56) References Cited

U.S. PATENT DOCUMENTS

| | | | | |
|---|---|---|---|---|
| 5,280,251 A * | 1/1994 | Strangio | ........................ | 324/539 |
| 5,689,726 A | 11/1997 | Lin | | |
| 6,195,408 B1 * | 2/2001 | Acharya et al. | .................... | 378/8 |
| 6,640,272 B1 | 10/2003 | Hartwell et al. | | |
| 6,832,168 B2 | 12/2004 | Graves et al. | | |
| 7,206,973 B2 * | 4/2007 | Daftardar | ........................ | 714/43 |
| 2004/0117707 A1 * | 6/2004 | Ellis et al. | ..................... | 714/733 |
| 2005/0132110 A1 * | 6/2005 | Daftardar | ..................... | 710/104 |
| 2007/0100574 A1 * | 5/2007 | Grimes et al. | ................ | 702/118 |
| 2007/0294520 A1 * | 12/2007 | Leigh et al. | ........................ | 713/1 |
| 2008/0065874 A1 * | 3/2008 | Geissler et al. | .................... | 713/1 |
| 2010/0275064 A1 * | 10/2010 | Decusatis et al. | ............... | 714/37 |

* cited by examiner

*Primary Examiner* — Nadeem Iqbal
(74) *Attorney, Agent, or Firm* — Cantor Colburn LLP; Steven Chiu

(57) ABSTRACT

A method of validating multi-cluster computer interconnects includes calculating a cable interconnect table associated with the multi-cluster computer, and distributing the cable interconnect table to a first transceiver in the first computer cluster and a second transceiver in the second computer cluster. The method also includes connecting a first end of a cable to the first transceiver and a second end of the cable to the second transceiver, transmitting a first neighbor identification from the first cluster to the second cluster, and a second neighbor identification from the second cluster to the first cluster, comparing the first neighbor identification with a desired first neighbor identification from the cable interconnect table to establish a first comparison result and the second neighbor identification with a desired second identification from the cable interconnect table to establish a second comparison result, and generating an alert based on the first and second comparison results.

16 Claims, 3 Drawing Sheets

VALIDATION OF COMPUTER INTERCONNECTS

FEDERAL RESEARCH STATEMENT

This invention was made with Government support under Contract No. HR0011-07-9-0002, awarded by the Defense Advanced Research Projects Agency (DARPA). The Government has certain rights in this invention.

BACKGROUND

The present invention relates to the art of computers and, more particularly, to validation of computer interconnects.

Certain computers, such as supercomputers, include massively parallel clusters of computation nodes interconnected by a high bandwidth fiber optic network. Current and next generation supercomputers are enormous in scale and may include up to, for example, a half-million processors housed in over 2,000 drawers that fill close to 200 equipment racks which are interconnected by as many as a half-million fiber-optic cables. Such a supercomputer has a footprint that is equivalent to half a football field. This unprecedented scale gives rise to a serious problem, namely how to correctly physically cable such a machine in a reasonable time period. Identifying and correcting cable errors is problematic, especially for cables that interconnect opposite ends of the supercomputer. Additionally, when nodes are moved, deleted, added or changed, time is lost in re-cabling and correcting cabling errors.

SUMMARY

According to one embodiment of the present invention, a method of validating multi-cluster computer interconnects includes applying minimal power to a first computer cluster and a second computer cluster, calculating a cable interconnect table associated with the multi-cluster computer, and distributing the cable interconnect table to a first transceiver in the first computer cluster and a second transceiver in the second computer cluster. The method also includes connecting a first end of a cable to the first transceiver and a second end of the cable to the second transceiver, transmitting a first neighbor identification from the first cluster through the cable to the second cluster, and a second neighbor identification from the second cluster through the cable to the first cluster, comparing the first neighbor identification with a desired first neighbor identification from the cable interconnect table to establish a first comparison result and the second neighbor identification with a desired second identification from the cable interconnect table to establish a second comparison result, and generating an alert based on the first and second comparison results.

A system corresponding to the above-summarized method is also described and claimed herein.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
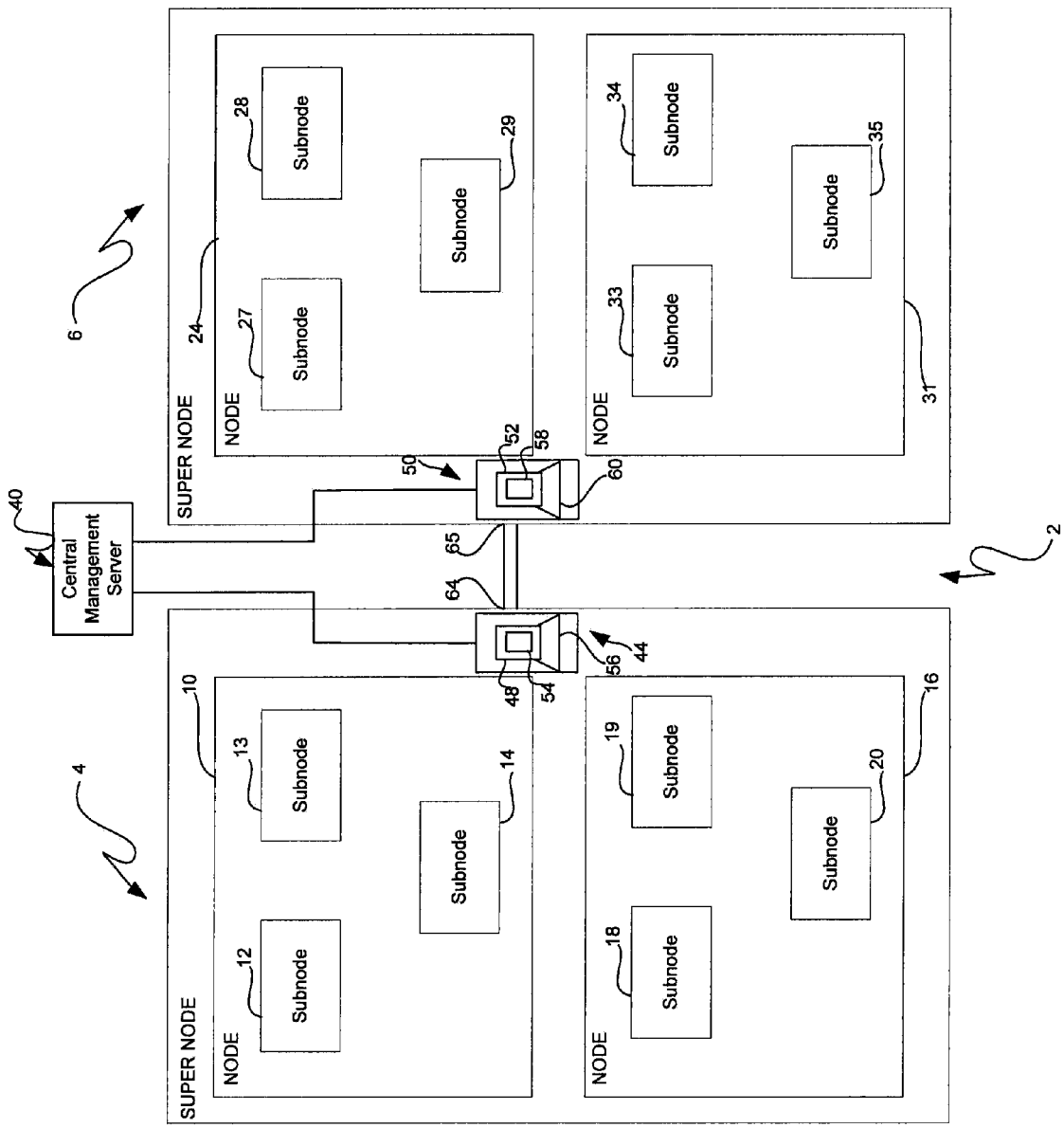
FIG. 1 is a schematic representation of a multi-cluster computer including a configuration validation system in accordance with an exemplary embodiment.

With reference to FIG. 1, a multi-cluster computer constructed in accordance with an exemplary embodiment of the present invention is indicated generally at 2. Multi-cluster computer 2 includes a first cluster or supernode 4 operatively linked to a second cluster or supernode 6. More specifically, first cluster 4 includes a first node 10 having a plurality of sub-nodes 12-14 associated therewith. First cluster 4 further includes a second node 16 having a plurality of sub-nodes 18-20 associated therewith. Similarly, second cluster 6 includes a first node 24 having a plurality of sub-nodes 27-29 associated therewith. Second cluster 6 also includes a second node 31 having a plurality of sub-nodes 33-35 associated therewith. At this point, it should be understood that the number of clusters, nodes and sub-nodes can vary widely depending upon the size, configuration and desired application of multi-cluster computer 2. In addition, it should be understood that the particular connectivity between sub-nodes, nodes and clusters can vary. In further accordance with the exemplary embodiment, first cluster 4 is operatively linked to second cluster 6 via an $I^2C$ bus to a central management server 40. Central management server 40 includes an association table identifying a particular connectivity between the various nodes and sub-nodes in each of first and second clusters 4 and 6.

In accordance with the exemplary embodiment, multi-cluster computer 2 includes a first validation system 44 associated with first cluster 4. First validation system 44 includes an optical transceiver 48. Similarly, second cluster 6 includes a second validation system 50 having an optical transceiver 52. First cluster 4 is further linked to second cluster 6 via a cable 62 which, in the exemplary embodiment shown, takes the form of a fiber optic cable having a first end 64 operatively connected to first validation system 44 and a second end 65 operatively connected to second validation system 54. As will be discussed more fully below, first and second validation systems ensure a proper connection between first and second clusters 4 and 6. That is, as will be discussed more fully below, first and second validation systems 44 and 54 ensure that first cluster 4 is properly connected to second cluster 6.

In accordance with the exemplary embodiment, transceiver 48 includes a small multi-bit comparator 54 and a dedicated communication path 56. Multi-bit comparator 54 is accessed by an $I^2C$ bus arranged within the multi-cluster computer. Dedicated communication path 56 is incorporated into transceiver 48 between transmit and receive portions. Preferably, dedicated communication path 56 is wired through the transceiver card substrate (not separately labeled) between two ground planes (not shown) in order to minimize electromagnetic noise coupling both sides of the transceiver. In a similar manner, transceiver 52 includes a multi-bit comparator 58 and a dedicated communication path 60. In this manner, the $I^2C$ bus is directly addressable from each transceiver 48 and 52. Accordingly, direct communication between each transceiver 48, 50 and central management server 40 is possible.

Figure 2:
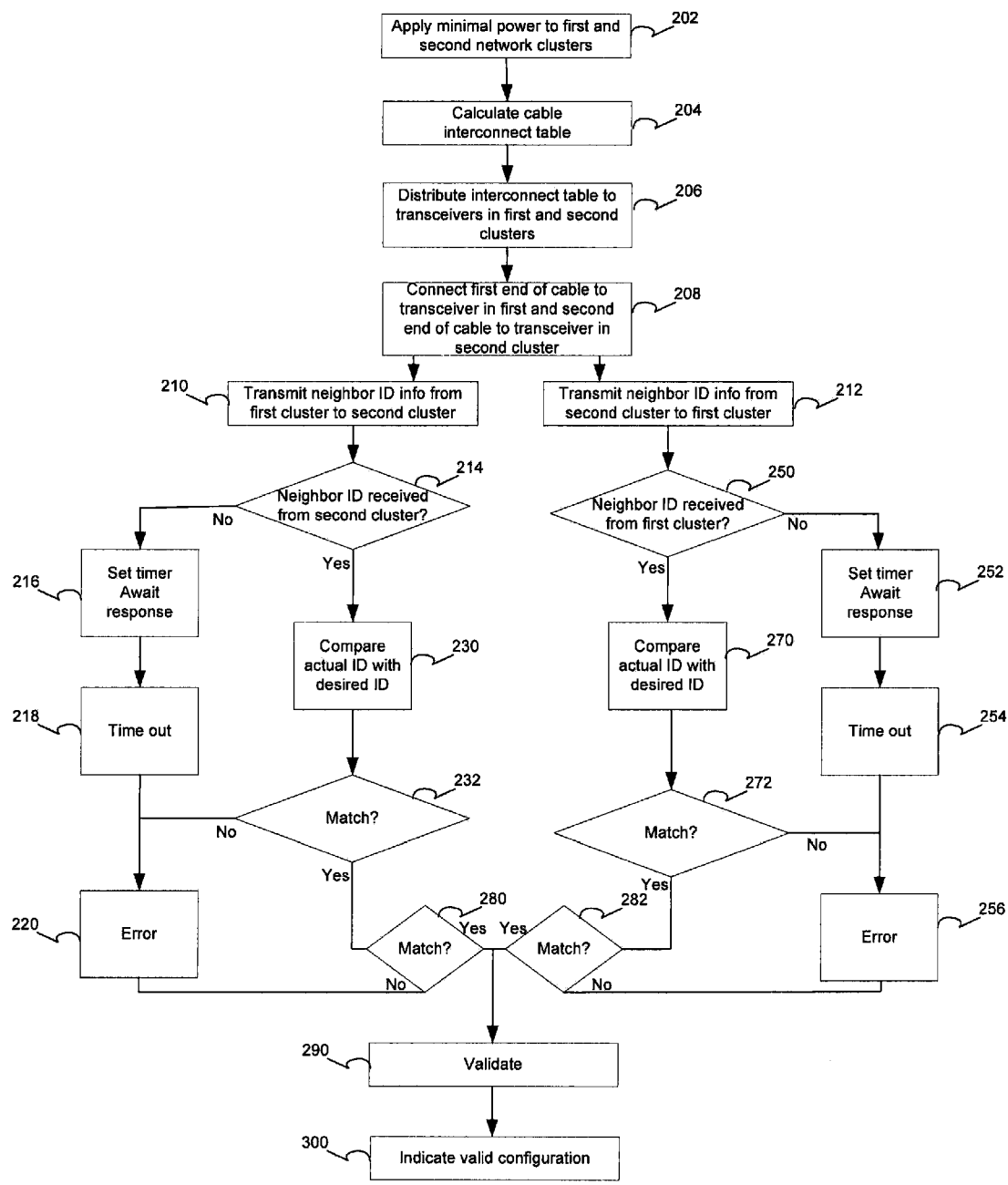
FIG. 2 is a flow diagram illustrating a method of validating a configuration of the multi-cluster computer of FIG. 1.

Reference will now be made to FIG. 2 in describing a method 200 of validating a configuration or interconnects within multi-cluster computer 2. In accordance with the exemplary embodiment, minimal power is applied to the first and second network clusters 4 and 6. Power is supplied at minimal levels such that there is only sufficient power to operate each optical transceiver 48, 52 and central management server 40. By providing only minimal power, there is no need for cooling multi-cluster computer 2, nor is there a requirement that each cluster of multi-cluster computer 2 be fully operational during configuration validation. After powering first and second clusters 4 and 6, central management server 40 calculates a cable interconnect table as indicated in block 204. The cable interconnect table is then distributed to each transceiver 48 and 52 arranged in first and second clusters 4 and 6 respectively as indicated in block 206. A first end 64 of cable 62 is connected to transceiver 48, and a second end 65 of cable 62 is connected to transceiver 52 as indicated in block 208.

A neighbor ID is transmitted from first cluster 4 to second cluster 6 through cable 62 as indicated in block 210. Similarly, a neighbor ID is transmitted from second cluster 6 to first cluster 4 through cable 62 as indicated in block 212. At this point, a determination is made whether the neighbor ID is received from second cluster 6 in first cluster 4 as indicated in block 214. If the neighbor ID is not received, a timer is set to a predetermined time limit as indicated in block 216. If the neighbor ID is not received from second cluster 6 by the end of the predetermined time limit as indicated in block 218, an error message is generated in block 220. If, on the other hand, the neighbor ID is received from the second cluster in block 214, a comparison is made between the actual ID received and a desired ID transmitted from the central management server 40 to determine a comparison result in block 230. At this point, a determination is made whether the comparison result is positive, i.e., indicating that a match exists between the actual ID and the desired ID, or negative, i.e., a match does not exist, as indicated in block 232. If the comparison result is negative, an error message is generated in block 220.

Similarly, a determination is made whether a neighbor ID is received from first cluster 4 at second cluster 6 as indicated in block 250. If no neighbor ID is received from the first cluster, a timer is set to a predetermined time limit to await a response as indicated in block 252. If no signal is received at the end of the predetermined time limit as indicated in block 254 an error message is generated in block 256. If, on the other hand the neighbor ID is received from first cluster 4, a comparison is made between the actual ID received and a desired ID to determine a comparison result as indicated in block 270. At this point, a determination is made whether comparison result is positive or negative as indicated in block 272. If the comparison result is negative, an error message is generated in block 256.

Once the comparison results are made, a first determination is made to identify whether the comparison result from second cluster 6 is positive in block 280 and whether the comparison result from cluster 4 is positive in block 282. If either or both comparison result is negative, error messages are generated in blocks 220 and 256 respectively If however, both comparison results are positive, a validation signal is indicated in block 290 and a valid configuration is indicated in block 300. In this manner, cable configurations are quickly and accurately validated even before the entire multi-cluster computer is assembled thereby doing away with costly and time consuming trouble shooting efforts.

Figure 3:
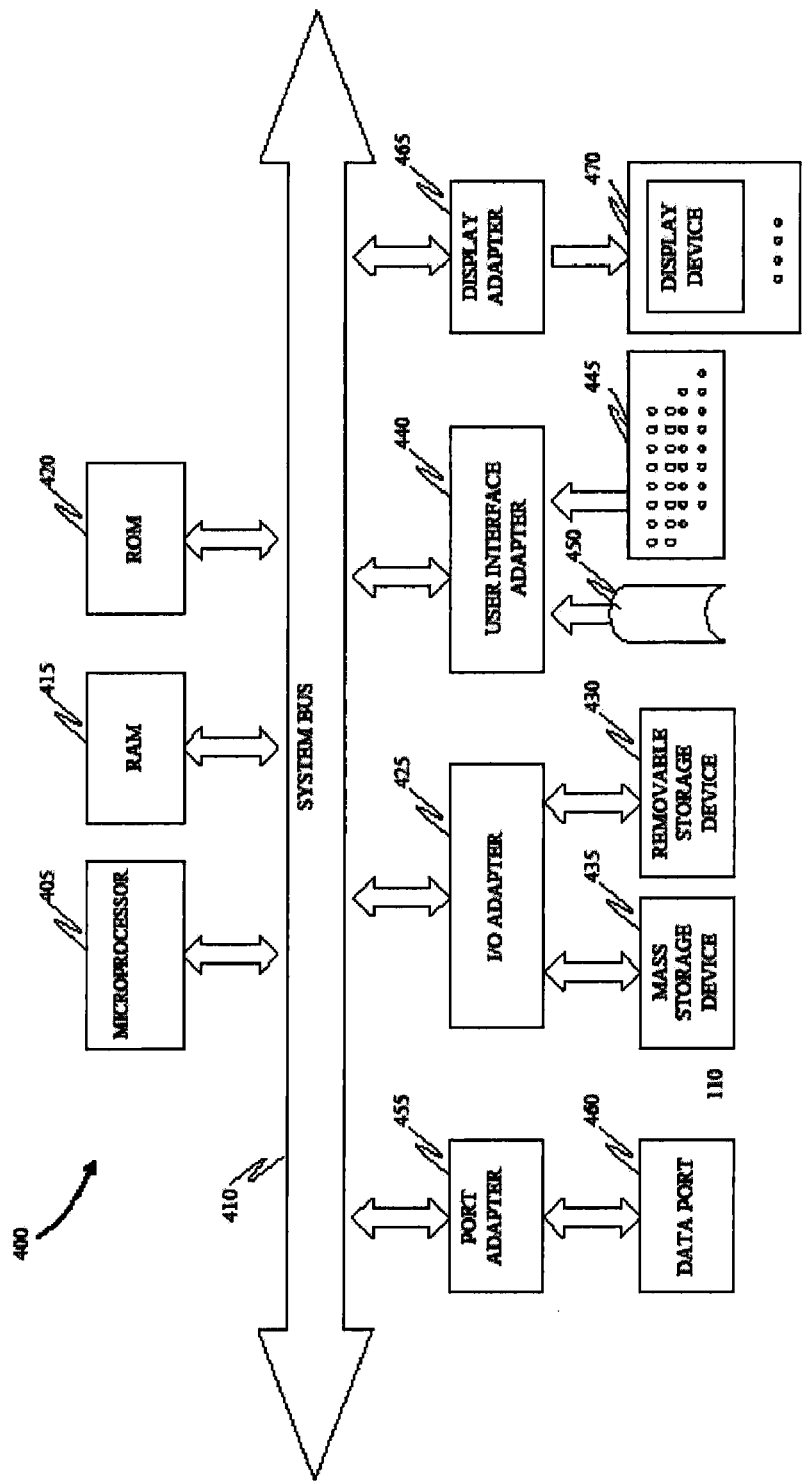
FIG. 3 is a schematic block diagram of a general-purpose computer suitable for practicing the exemplary method.

Generally, the method of validating computer interconnects described herein is practiced with a general-purpose computer and the method may be coded as a set of instructions on removable or hard media for use by the general-purpose computer. FIG. 3 is a schematic block diagram of a general-purpose computer suitable for practicing the present invention embodiments. In FIG. 3, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of validating multi-cluster computer interconnects, the method comprising:
   applying minimal power to a first computer cluster and a second computer cluster;
   calculating a cable interconnect table associated with the multi-cluster computer;
   distributing the cable interconnect table to a first transceiver in the first computer cluster and a second transceiver in the second computer cluster;

connecting a first end of a cable to the first transceiver and a second end of the cable to the second transceiver;

transmitting a first neighbor identification from the first cluster through the cable to the second cluster, and a second neighbor identification from the second cluster through the cable to the first cluster;

comparing the first neighbor identification with a desired first neighbor identification from the cable interconnect table to establish a first comparison result and the second neighbor identification with a desired second identification from the cable interconnect table to establish a second comparison result;

generating an alert based on the first and second comparison results;

setting a timer to a first time limit whenever the second neighbor identification is not received at the first transceiver; and generating an alert if the second neighbor identification is not received at the first transceiver at the expiration of the time limit.

2. The method of claim 1, wherein generating an alert based on the first and second comparison results comprises generating a validation signal whenever the first and second comparison results are positive.

3. The method of claim 2, wherein generating a validation signal comprises providing one of a visual and audible indicator.

4. The method of claim 1, wherein generating an alert based on the first and second comparison results comprises generating an error signal whenever one of the first and second comparison results is negative.

5. The method of claim 4, wherein generating an alert based on the first and second comparison results comprises generating an error signal whenever both of the first and second comparison results are negative.

6. The method of claim 1, wherein distributing the cable interconnect table to the first transceiver in the first computer cluster and the second transceiver in the second computer cluster comprises passing the cable interconnect table from a central management server through an $I^2C$ bus to each of the first and second transceivers.

7. The method of claim 1, wherein establishing the first comparison result comprises communicating through a communication path that directly connects a transmit side of the first transceiver and a receive side of the first transceiver.

8. The method of claim 1, wherein establishing the second comparison result comprises communicating through a communication path that directly connects a transmit side of the second transceiver and a receive side of the second transceiver.

9. A system for validating computer interconnects comprising:

a central processing unit (CPU), said CPU being interconnected functionally via a system bus to:

an input/output (I/O) adapter connecting to at least one of a removable data storage device, a program storage device, and a mass data storage device;

a user interface adapter connecting to one or more computer input devices;

a display adapter connecting to a display device; and at least one memory device thereupon stored a set of instructions which, when executed by said CPU, causes said system to:

calculate a cable interconnect table associated with the multi-cluster computer;

distribute the cable interconnect table to a first transceiver in a first computer cluster and a second transceiver in a second computer cluster;

transmit a first neighbor identification from the first cluster through a cable to the second cluster, and a second neighbor identification from the second cluster through the cable to the first cluster;

compare the first neighbor identification with a desired first neighbor identification from the cable interconnect table to establish a first comparison result and the second neighbor identification with a desired second identification from the cable interconnect table to establish a second comparison result; and generate an alert based on the first and second comparison results;

set a timer to a first time limit whenever the second neighbor identification is not received at the first transceiver; and generate an alert whenever the second neighbor identification is not received at the first transceiver at the expiration of the time limit.

10. The system of claim 9, wherein, the set of instructions, when executed by said CPU, causes said system to: generate a validation signal whenever the first and second comparison results are positive.

11. The system of claim 10, wherein, the set of instructions, when executed by said CPU, causes said system to: provide one of a visual and audible indicator for the validation signal.

12. The system of claim 9, wherein, the set of instructions, when executed by said CPU, causes said system to: generate an error signal whenever one of the first and second comparison results is negative.

13. The system of claim 9, wherein, the set of instructions, when executed by said CPU, causes said system to: generate an error signal whenever both of the first and second comparison results are negative.

14. The system of claim 9, wherein, the set of instructions, when executed by said CPU, causes said system to: distribute the cable interconnect table from a central management server through an $I^2C$ bus to each of the first and second transceivers.

15. The system of claim 9, wherein, the set of instructions, when executed by said CPU, causes said system to: communicate through a communication path that directly connects a transmit side of the first transceiver and a receive side of the first transceiver to establish the first comparison result.

16. The system of claim 9, wherein, the set of instructions, when executed by said CPU, causes said system to: communicate through a communication path that directly connects a transmit side of the second transceiver and a receive side of the second transceiver to establish the second comparison result.

* * * * *